June 29, 1926.
O. LASCHE ET AL
1,590,895
DISTILLATION OF SOLID MATERIAL
Filed Nov. 15, 1923
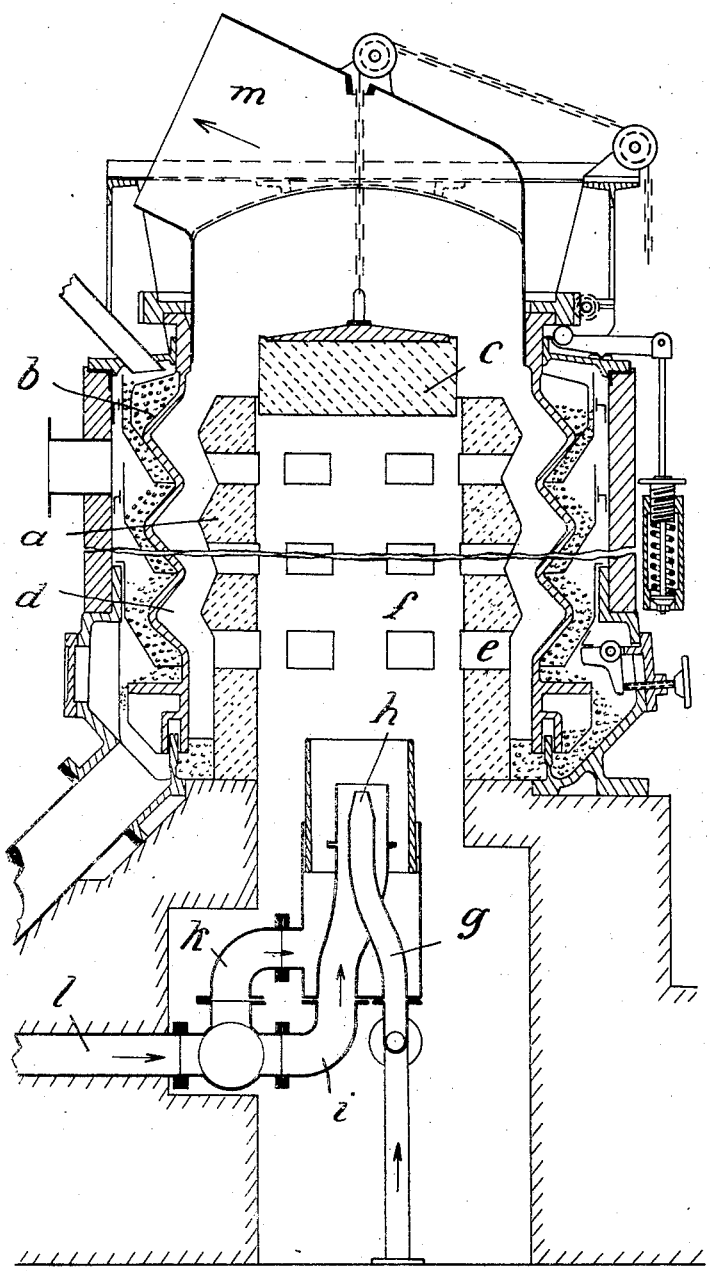
Inventors
Oskar Lasche, Deceased,
and Carl Geissen,
Fritz Lasche, Executor
of the Estate of Oskar Lasche.
by
Attorney.

Patented June 29, 1926.

1,590,895

UNITED STATES PATENT OFFICE.

OSKAR LASCHE, DECEASED, LATE OF BERLIN-CHARLOTTENBURG, GERMANY; BY FRITZ LASCHE, EXECUTOR, OF BERLIN-CHARLOTTENBURG, AND CARL GEISSEN, OF BERLIN-SCHONEBERG, GERMANY, ASSIGNORS TO KOHLENVEREDLUNG G. M. B. H., OF BERLIN, GERMANY, A FIRM.

DISTILLATION OF SOLID MATERIAL.

Application filed November 15, 1923. Serial No. 675,022.

Our invention relates to the distillation of material, more especially bituminous fuel. Its particular object is to effect distillation of such materials in a more economical and efficient manner than has hitherto been possible.

In order to expel the volatile constituents from bituminous fuel, the material must be exposed to a constant temperature not exceeding a predetermined limit, care being taken not to overheat the material nor the volatile matter expelled therefrom. On the other hand, the degree of utilization of the heat energy available for the heating of the material plays a decisive role in the economy of the distillation process.

In the distillation of bituminous material, as hitherto practiced, direct heating was excluded as entailing irregular variations of temperature and other serious drawbacks. On the other hand, the indirect heating resorted to results in a very poor transmission of heat from the heating gases to the material to be treated across the intervening partition or wall.

The present invention provides means for ensuring a uniform heating of the material within a predetermined range of temperature, at the same time fully utilizing the heat energy stored in the heating gases so as to render the process highly economical.

According to this invention the material to be heated is preferably caused to move in a comparatively thin layer over a heating surface which is heated by heating gases and by heat radiated from a massive heating body. The greater part of the heat available in the heating gases is utilized for heating this heating body which at the same time acts as a heat accumulating and equalizing means, cooling the heating gases down to the predetermined temperature required, storing the heat taken up from the gases, rendering the heating of the material to be treated more uniform by gradually and uniformly emitting the heat by radiation, and preventing local overheating of the material and of the volatile constituents liberated therefrom. In a preferred form of our invention we cause the material which shall be subjected to distillation, to travel in downward direction past and in contact with the outer surface of a hollow cylindrical wall or shell presenting a number of superposed inclined heating surfaces. This wall or shell is heated by means of a gas burner or the like disposed centrally below it and an apertured hollow thick walled cylindrical heat storing and equalizing mass is placed above the burner and in the way of the heating gases, a clearance being provided between the heat storing mass and the outer wall or shell so that the heating gases after having passed through the heat storing and equalizing cylinder and out through the apertures provided therein and having thus been cooled down to the admissible temperature come in contact with the inner surface of the cylindrical wall or shell across which their heat together with the heat emitted from the heat storing cylinder by radiation is transmitted to the material traveling past and in contact therewith. Means can be provided for varying the area of the heat storing mass exposed to the action of the flame, thereby regulating the temperature of the flame as well as the quantity of heat energy accumulated for radiation. In this manner all danger of overheating the solid material or the distillation products is avoided. The heating gases can enter the oven with a far higher temperature than was hitherto possible, the heat storing and equalizing mass providing for the necessary cooling down and for the equalizing without any appreciable loss of their heat energy.

In the drawings affixed to this specification and forming part thereof an oven adapted for carrying our invention into practice is illustrated diagrammatically in vertical section by way of example.

Referring to the drawings, the oven substantially comprises a hollow cylinder $a$ of refractory material having a wavy outer surface this cylinder forming the heat accumulator and equalizer. This cylinder is surrounded by a cylindrical shell $b$ of wavy section consisting of suitable material, such as for instance cast iron, the outer surface of which serves as a guide surface for the material to be distilled. The top portion of the hollow cylinder $a$ is closed by a sliding cover $c$ of refractory material which can be adjusted in height by aid of a suitable lifting device. The annular space $d$ confined between the outer cylinder b and the inner cylinder a communicates with the interior of the cylinder a by means of ports e. Into the cylinder a there is supplied heating gas through the gas pipe g, this gas being burnt in the burner h. An air pipe i serves for supplying the air of combustion, the quantity of which can be controlled by suitable means (not shown). In order to regulate the temperature of the heating gas according to requirements, a branch pipe k comprising controlling means (not shown) is connected with the main air pipe l and serves for supplying the oven with the required quantity of secondary air. The heating gases after having given off their heat escape through the chimney m.

The operation of the oven is the following: The heating gases form a narrow flame extending into the interior f of the oven and are mixed with the secondary air supplied through the branch pipe k. The heating gases first heat the inner cylinder from within and thereafter pass through the ports e into the annular space d before escaping through the chimney m, being eventually further utilized in suitable heat exchange devices, for instance in a device for preliminary drying of the material to be distilled. On their way to the chimney the gases heat the cylinder a from without and shell b from within. Consequently, the outer surface of the shell b is heated not only by direct contact of the heating gases with its inner surface, but also by the heat emitted by radiation from the heat storing and equalizing cylinder a. In order to render the heating of the inner cylinder as efficient as possible, the ports e are mainly arranged at the lower end of the cylinder a near the burner, whereby the flame is caused to extend more or less into the inner space f according to the position of the sliding cover c and is compelled to change its direction in the cylinder and in the annular space d. Obviously, the heating gases may also be conducted in a different manner without in any way altering the result. We may, for instance, cause the heating gases to enter at the bottom of the interior of the cylinder a, to rise in the inner space, to descend again in the annular space between cylinder a and heating shell b and to escape near the bottom of the surface.

We wish it to be understood that we do not desire to be limited to the exact details of construction shown and described, for obvious modifications will occur to a person skilled in the art.

We claim:—

1. The method of distilling bituminous material comprising forming such material into a hollow body over a heating surface, subjecting the surface to heat radiated from a massive heating body arranged therein and in spaced relation to the hollow body, and agitating the material during the heating operation.

2. The method of distilling bituminous material comprising forming such material into a hollow body over a heating surface and heating said surface from within by heat radiated from a massive body.

3. The method of distilling solid bituminous material comprising continuously moving such material along a heating surface and heating said surface primarily by the heat radiated from a massive heating body.

4. The method of distilling bituminous material comprising passing such material in a comparatively thin layer of annular cross section over a heating surface and subjecting said surface to the action of heat from a massive heating body.

5. The method of distilling bituminous material comprising passing such material substantially downwardly in a comparatively thin layer of annular cross section on the outside of a heating surface and heating said surface from within by heat radiated from a massive heating body.

6. The method of distilling bituminous material disposed over a heating surface which comprises heating a massive body by hot gases the temperature of which material exceeds the temperature admissible for such distillation whereby heat is stored in said body and the gases are cooled down to the admissible temperature, and subjecting said heating surface to the heat radiated from said body and the cooled gases.

In testimony whereof we affix our signatures.

FRITZ LASCHE,
*Executor of the Estate of Oskar Lasche, deceased.*

CARL GEISSEN.